(12) United States Patent
Mulvane et al.

(10) Patent No.: US 11,472,263 B2
(45) Date of Patent: Oct. 18, 2022

(54) LAMINATED WINDSHIELD VENT

(71) Applicant: Taylor Made Group, LLC, Gloversville, NY (US)

(72) Inventors: Curtis Mulvane, Fort Wayne, IN (US); Brian Castleman, New Haven, IN (US)

(73) Assignee: Taylor Made Group, LLC, Gloversville, NY (US)

( * ) Notice: Subject to any disclaimer, the term of this patent is extended or adjusted under 35 U.S.C. 154(b) by 10 days.

(21) Appl. No.: 17/178,582

(22) Filed: Feb. 18, 2021

(65) Prior Publication Data

US 2021/0252944 A1 Aug. 19, 2021

Related U.S. Application Data

(60) Provisional application No. 62/977,898, filed on Feb. 18, 2020.

(51) Int. Cl.
*B60H 1/26* (2006.01)

(52) U.S. Cl.
CPC .................. *B60H 1/267* (2013.01)

(58) Field of Classification Search
CPC .......... B60H 1/24; B60H 1/241; B60H 1/242; B60H 1/265; B60H 1/267; B60H 1/28; B60J 1/002; B62J 17/04
See application file for complete search history.

(56) References Cited

U.S. PATENT DOCUMENTS

| | | | | |
|---|---|---|---|---|
| 1,178,971 A | * | 4/1916 | Thode | B60H 1/00371 454/93 |
| 3,311,041 A | * | 3/1967 | Fr Ahrens | B60H 1/267 454/95 |
| 4,615,556 A | * | 10/1986 | Stahel | B62J 17/10 296/78.1 |
| 4,970,946 A | * | 11/1990 | Ivey | B63J 2/04 114/211 |
| 6,168,516 B1 | | 1/2001 | White | |
| 6,712,689 B2 | | 3/2004 | Clarkson et al. | |
| 6,957,849 B2 | | 10/2005 | Eloian et al. | |
| 7,316,447 B2 | | 1/2008 | Kelly | |
| 7,954,443 B2 | | 6/2011 | Mason et al. | |
| 2019/0135082 A1 | | 5/2019 | Bender | |

FOREIGN PATENT DOCUMENTS

| | | |
|---|---|---|
| DE | 1 699 479 | 5/1955 |
| FR | 2 879 511 | 6/2006 |
| GB | 368429 A * | 3/1932 |
| GB | 831013 | 3/1960 |

OTHER PUBLICATIONS

International Search Report and Written Opinion dated May 31, 2021 issued in PCT International Patent Application No. PCT/US2021/018469, 13 pp.

* cited by examiner

*Primary Examiner* — Jessica Yuen
(74) *Attorney, Agent, or Firm* — Nixon & Vanderhye P.C.

(57) ABSTRACT

A windshield vent includes a housing plate with a vent opening securable to a windshield. A vent flap secured in the opening is rotatable on an axle between a closed position and an open position. The vent system is suitable for laminated glass windshields including a recess in which the housing plate is secured.

13 Claims, 6 Drawing Sheets

LAMINATED WINDSHIELD VENT

CROSS-REFERENCES TO RELATED APPLICATIONS

This application claims the benefit of U.S. Provisional Patent Application Ser. No. 62/977,898, filed Feb. 18, 2020, the entire content of which is herein incorporated by reference.

STATEMENT REGARDING FEDERALLY SPONSORED RESEARCH OR DEVELOPMENT (NOT APPLICABLE)

BACKGROUND

The invention relates to a venting solution for a laminated glass windshield.

It is desirable to include a vent in a windshield for marine, ATV or other sport vehicle applications. There currently exist many options available for polycarbonate windshields. Laminated glass windshields, however, typically are unable to incorporate a venting option as it is difficult to cut holes in laminated glass.

SUMMARY

It would thus be desirable to provide a venting solution for a laminated glass windshield.

In an exemplary embodiment, a windshield vent includes a housing plate with a vent opening securable to a windshield, and a vent flap secured in the opening. The vent flap is rotatable on an axle between a closed position and an open position.

The windshield vent may be provided with two clamps, one each secured in opposite sides of the vent opening. The clamps include respective apertures that are configured to receive the axle of the vent flap. The windshield vent may further include a ball and spring plunger coupled with the vent flap, where each of the two clamps may further include detents selectively engageable with the ball and spring plunger such that the ball and spring plunger is configured to secure the vent flap in an operator-selected position. In some embodiments, each of the two clamps includes a two-piece assembly, where the detents are disposed on only one piece of the two-piece assembly. With the two-piece assembly, at least a portion may be disposed sandwiching the housing plate, where the vent flap is rotatable relative to the clamps. The two-piece assembly may be secured together with a connector.

The vent flap may include extension arms and facing surfaces respectively engaging each of the two clamps, where the clamps each define a circular ridge. The circular ridges may be sandwiched between the extension arms and the facing surfaces.

In another exemplary embodiment, a laminated windshield includes a laminated glass material with a perimeter, a recess manufactured into the perimeter, and the vent system of the described embodiments. The housing plate may be bonded to an inside surface of the laminated glass material.

BRIEF DESCRIPTION OF THE DRAWINGS

These and other aspects and advantages will be described in detail with reference to the accompanying drawings, in which.

DETAILED DESCRIPTION

Figure 1:
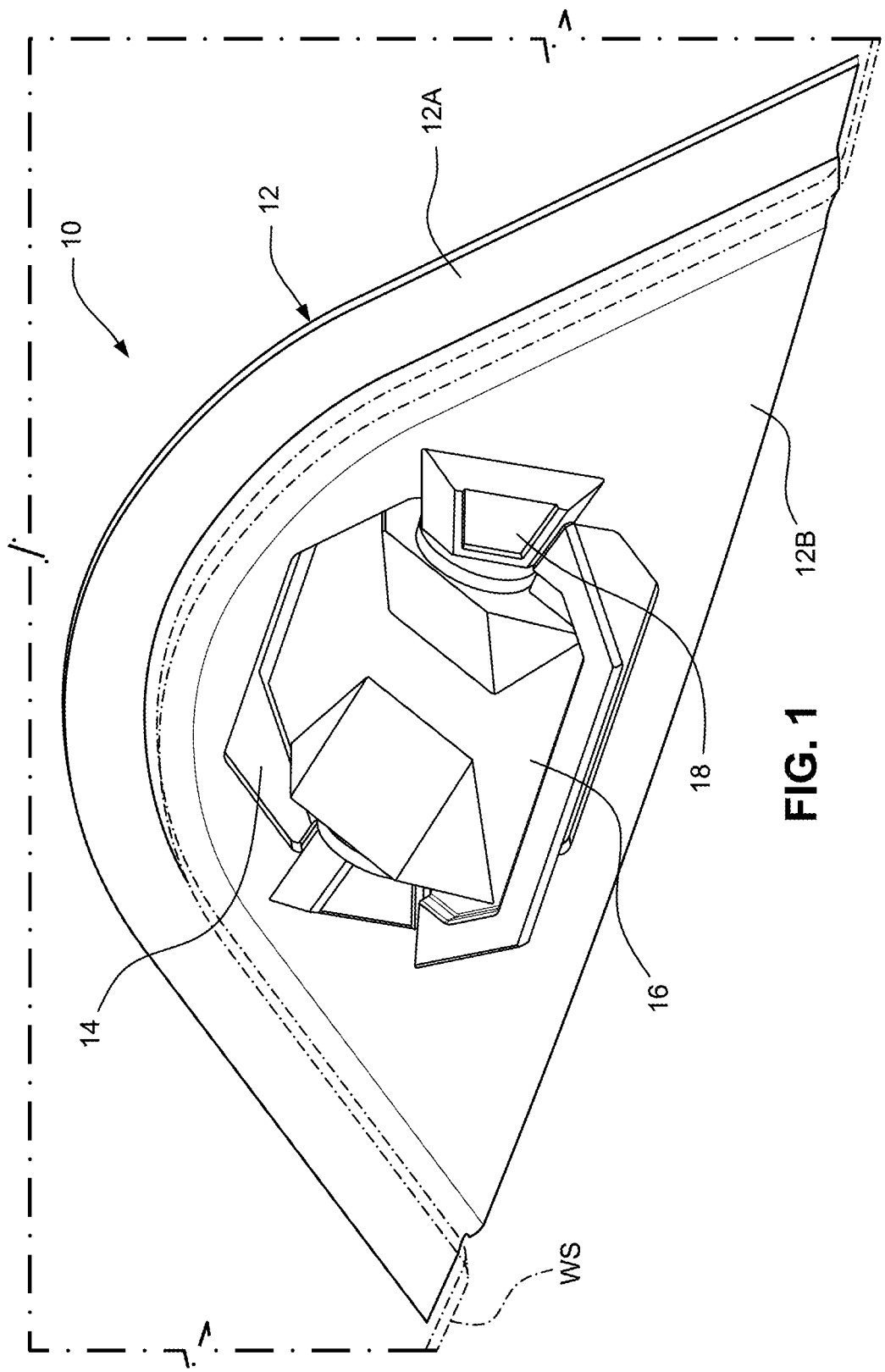
FIG. 1 shows the vent system of the described embodiments installed in a laminated windshield.

With reference to FIG. 1, the vent system 10 includes a housing plate 12 securable to a windshield WS. The housing plate 12 includes a connection tab 12A and a recessed section 12B.

Figure 2:
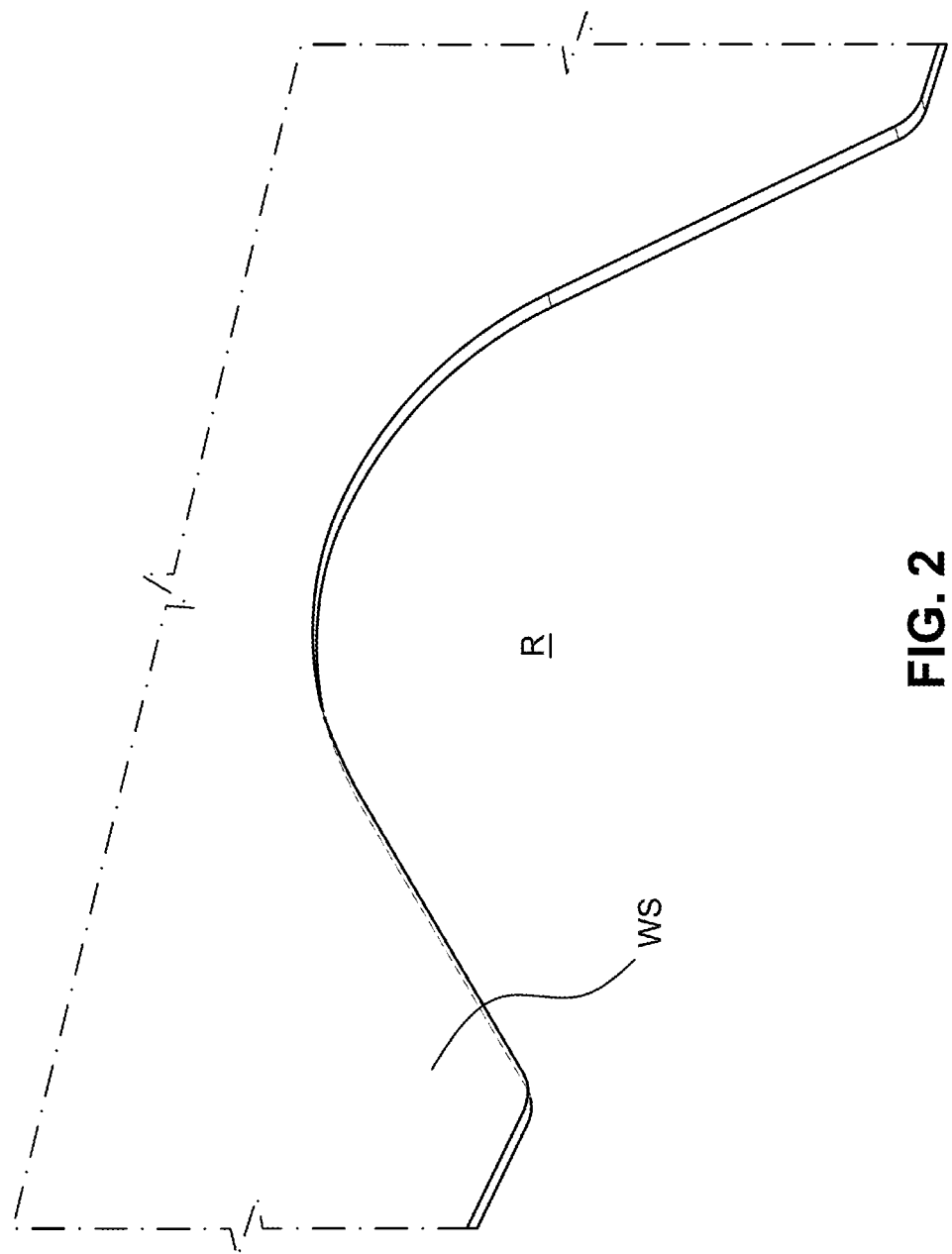
FIG. 2 shows an exemplary recess manufactured in the laminated windshield.

As shown in FIG. 2, the windshield WS includes a recess R manufactured into the perimeter. That is, the recess R is formed in the laminated glass material during manufacture of the windshield.

With continued reference to FIG. 1, the recessed section 12B of the housing plate 12 is sized corresponding to the recess R in the windshield WS. The connection tab 12A is secured by bonding with an adhesive or the like to an inside surface of the windshield WS, and the recessed section 12B fills in the windshield recess R.

Figure 3:
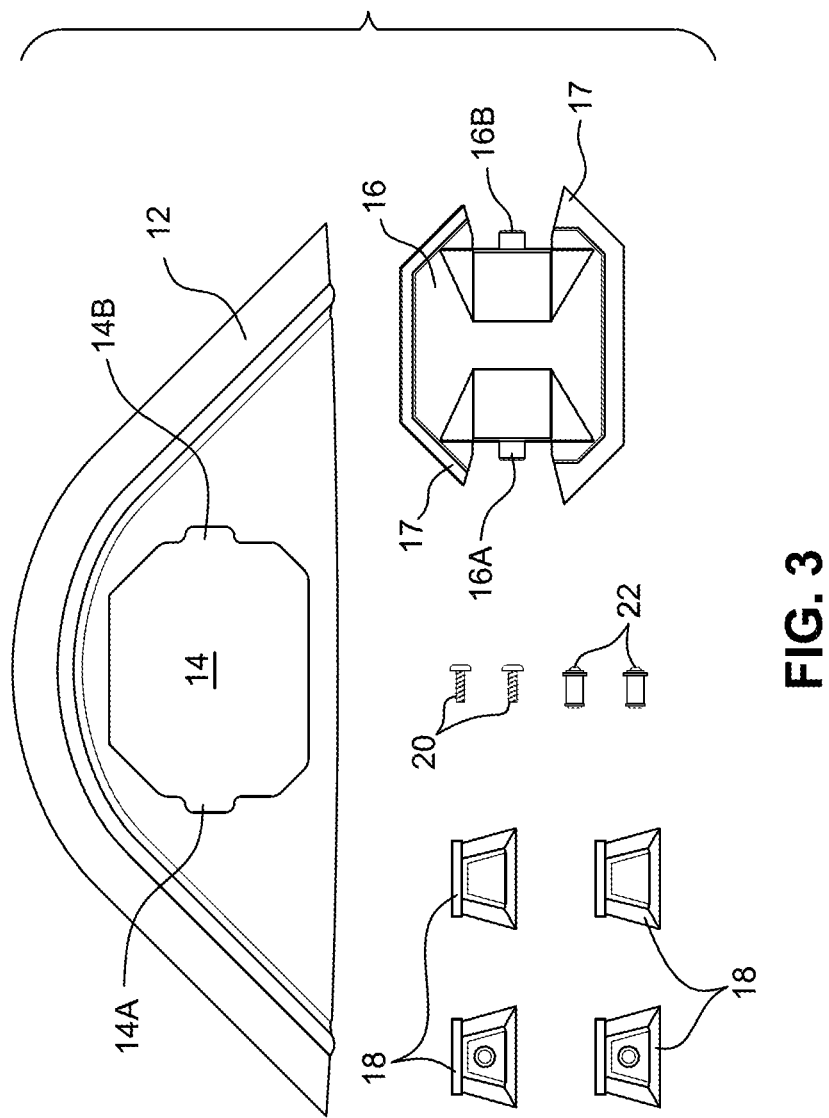
FIG. 3 is an exploded view of the vent system parts.

FIG. 3 is an exploded view of the vent system parts. The housing plate 12 includes a vent opening 14. The vent opening 14 includes left and right notches 14A, 14B. A vent flap 16 is securable in the opening 14. The vent flap 16 includes a left side axle 16A and a right side axle 16B. The vent flap 16 is also provided with extension arms 17.

The vent system also includes a pair of clamps 18 respectively secured over each of the notches 14A, 14B in the housing plate opening 14. Each of the clamps 18 is formed of a two-piece assembly secured via a screw 20 or other connector. The system also includes at least one ball and spring plunger 22 coupled with the vent flap 16.

Figure 4:
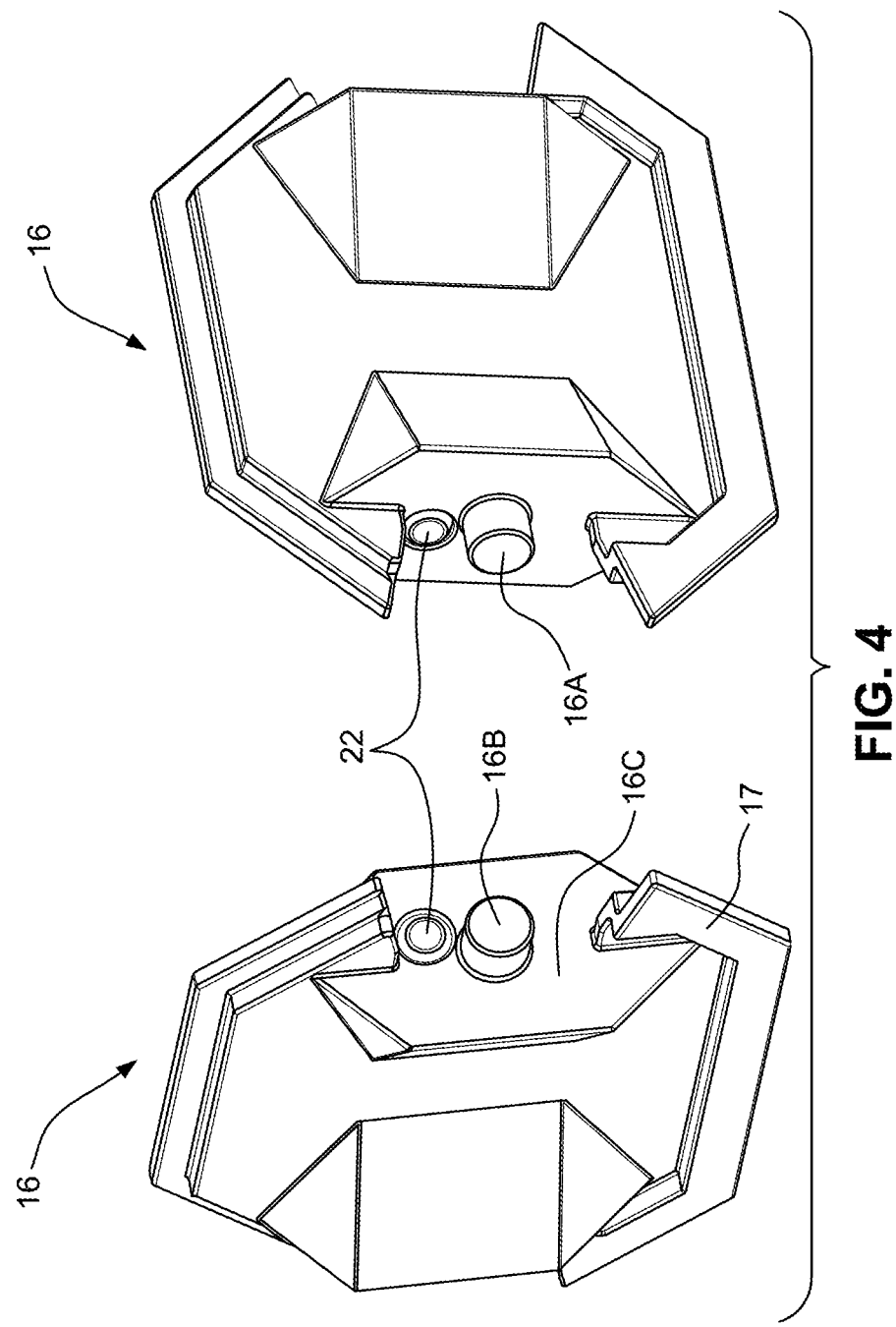
FIG. 4 shows perspective views of the vent flap.

As shown in FIG. 4, in some embodiments, the ball and spring plunger 22 is press fit into an opening in each side of the vent flap 16.

Figure 5:
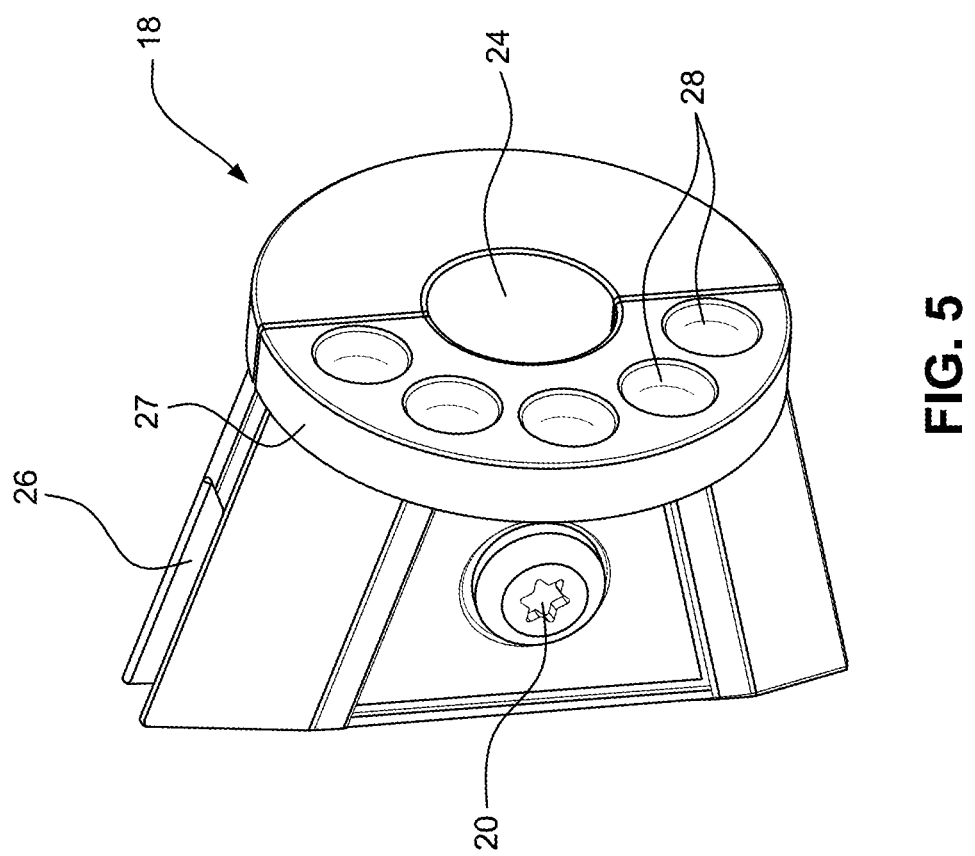
FIG. 5 is a close-up view of a clamp.

FIG. 5 is a close-up view of one of the clamps 18. Each clamp may be formed of a two-piece assembly, where the pieces are secured together via the connector 20. When connected, the clamp parts define an aperture 24 that is configured to receive the axle 16A, 16B of the vent flap 16. As also shown in FIG. 5, the parts of the clamp 18 when assembled define a slot 26 that receives the housing plate 12. The parts of the clamp 18 also define a circular ridge 27, which is engaged by the extension arms 17 of the flap 16 when assembled. That is, the circular ridge 27 is sandwiched between the extension arms 17 and a facing surface 16C of the flap. See FIGS. 1, 4 and 6. This construction provides for smoother and more secured rotation and positioning of the flap 16.

One side of each clamp 18 may be provided with detents 28 on a surface facing the vent flap 16. The detents 28 are selectively engageable with the ball and spring plunger 22. In this manner, the ball and spring plunger 22 is configured to secure the vent flap 16 in an operator-selected position. The operator can readily adjust the position of the vent flap 16 by hand. In some embodiments, as shown in FIG. 5, the detents 28 are disposed on only one piece of the two-piece assembly.

Figure 6:
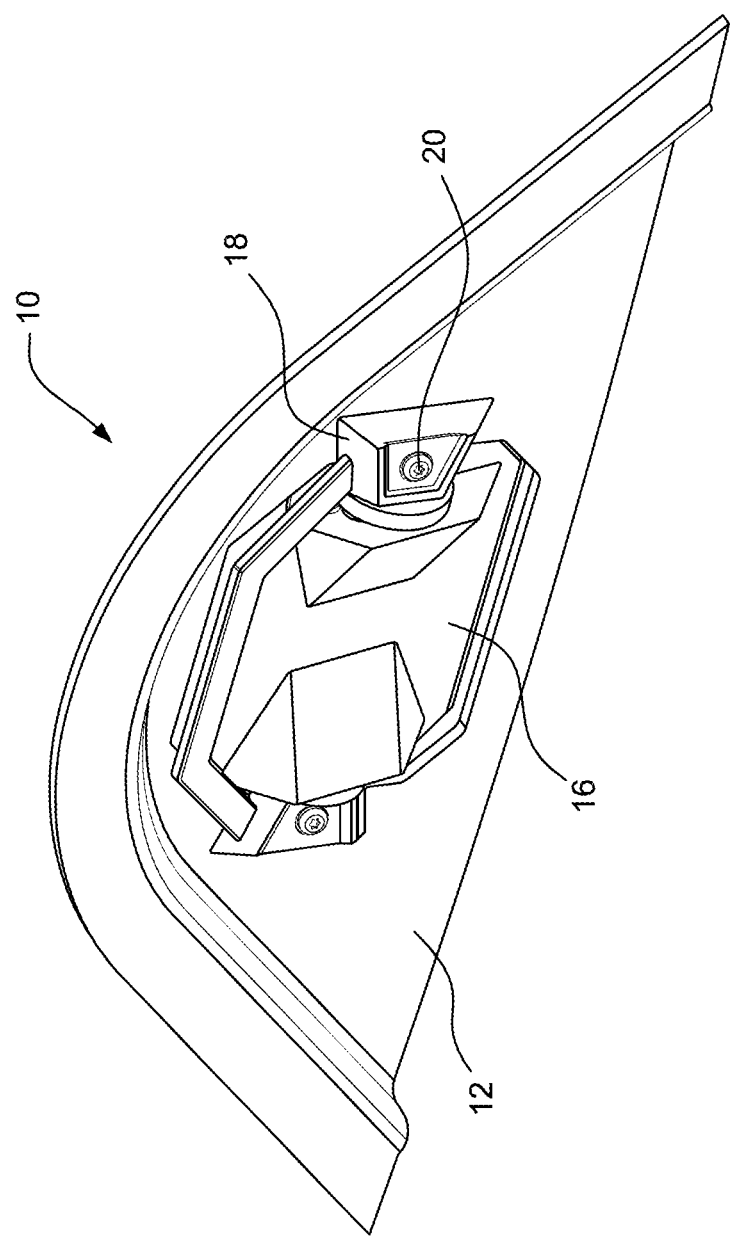
FIG. 6 is an inside view of the vent system with the vent flap open to the first detent.

The clamps 18 thus rotatably secure the vent flap 16 in the vent opening 14 of the housing plate 12. The axles 16A, 16B are rotatable in the corresponding apertures 24 defined in the clamps 18. The vent flap 16 is rotatable on the axles 16A, 16B between a closed position and an open position. With one or both sides of the vent flap 16 including the ball and spring plungers 22, the vent flap 16 can be readily positioned as desired. In FIG. 6, the vent flap 16 is shown in a position open to the first detent 28 on the clamp 18.

The vent assembly of the described embodiments is suited for installation in a pre-manufactured recess in a laminated windshield. The housing plate can be sized to accommodate any size recess in a laminated windshield. The vent flap secured in the housing plate is selectively positionable according to user preference. The vent assembly provides a venting solution for a laminated (or other type) windshield.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A windshield vent comprising:
   a housing plate securable to a windshield, the housing plate including a vent opening;
   two clamps, one each secured in opposite sides of the vent opening, each of the two clamps including a slot that receives the housing plate, the clamps including respective apertures; and
   a vent flap secured between the two clamps in the vent opening and including a left side axle engaging one of the respective apertures and a right side axle engaging the other of the respective apertures, the vent flap being rotatable on the left and right side axles between a closed position and an open position.

2. A windshield vent according to claim 1, further comprising a ball and spring plunger coupled with the vent flap, wherein each of the two clamps further comprises detents selectively engageable with the ball and spring plunger such that the ball and spring plunger is configured to secure the vent flap in an operator-selected position.

3. A windshield vent according to claim 2, wherein each of the two clamps comprises a two-piece assembly, and wherein the detents are disposed on only one piece of the two-piece assembly.

4. A windshield vent according to claim 1, wherein each of the two clamps comprises a two-piece assembly, at least a portion of which is disposed sandwiching the housing plate, and wherein the vent flap is rotatable relative to the clamps.

5. A windshield vent according to claim 4, wherein the two-piece assembly is secured together with a connector.

6. A windshield vent according to claim 1, wherein the vent flap comprises extension arms and facing surfaces respectively engaging each of the two clamps, and wherein the clamps each define a circular ridge, the circular ridges being sandwiched between the extension arms and the facing surfaces.

7. A laminated glass windshield comprising:
   a laminated glass material with a perimeter;
   a recess manufactured into the perimeter; and
   a vent system secured in the recess, the vent system including:
      a housing plate secured to the laminated glass material adjacent the recess, the housing plate including a vent opening,
      two clamps, one each secured in opposite sides of the vent opening, each of the two clamps including a slot that receives the housing plate, the clamps including respective apertures, and
      a vent flap secured between the two clamps in the vent opening and including a left side axle engaging one of the respective apertures and a right side axle engaging the other of the respective apertures, the vent flap being rotatable on the left and right side axles between a closed position and an open position.

8. A laminated glass windshield according to claim 7, wherein the housing plate is bonded to an inside surface of the laminated glass material.

9. A laminated glass windshield according to claim 7, wherein the vent system further comprises a ball and spring plunger coupled with the vent flap, wherein each of the two clamps further comprises detents selectively engageable with the ball and spring plunger such that the ball and spring plunger is configured to secure the vent flap in an operator-selected position.

10. A laminated glass windshield according to claim 9, wherein each of the two clamps comprises a two-piece assembly, and wherein the detents are disposed on only one piece of the two-piece assembly.

11. A laminated glass windshield according to claim 7, wherein each of the two clamps comprises a two-piece assembly, at least a portion of which is disposed sandwiching the housing plate, and wherein the vent flap is rotatable relative to the clamps.

12. A laminated glass windshield according to claim 11, wherein the two-piece assembly is secured together with a connector.

13. A laminated glass windshield according to claim 7, wherein the vent flap comprises extension arms and facing surfaces respectively engaging each of the two clamps, and wherein the clamps each define a circular ridge, the circular ridges being sandwiched between the extension arms and the facing surfaces.

\* \* \* \* \*